United States Patent [19]

Kleine et al.

[11] 4,021,901
[45] May 10, 1977

[54] METHOD OF SIZING HEAT EXCHANGE PANELS

[75] Inventors: Charles A. Kleine, Florissant, Mo.;
Verne L. Middleton, East Alton, Ill.

[73] Assignee: Olin Corporation, New Haven, Conn.

[22] Filed: Nov. 17, 1975

[21] Appl. No.: 632,645

Related U.S. Application Data

[63] Continuation-in-part of Ser. No. 573,953, May 2, 1975.

[52] U.S. Cl. .................. 29/157.3 D; 29/157.3 V; 29/421 R; 228/118; 228/160; 113/118 V; 165/170; 62/523
[51] Int. Cl.² ........................................ B23P 15/26
[58] Field of Search .............. 29/157.3 D, 157.3 V, 29/421 R; 228/118, 160; 113/118 D, 118 V; 165/170; 62/523

[56] References Cited

UNITED STATES PATENTS

| | | | |
|---|---|---|---|
| 3,059,324 | 10/1962 | Goff | 228/118 |
| 3,178,806 | 4/1965 | Keith | 29/157.3 V |
| 3,216,093 | 11/1965 | Tranel | 29/421 |
| 3,271,846 | 9/1966 | Buechele et al. | 29/421 |
| 3,706,246 | 12/1972 | Keith | 228/118 |

*Primary Examiner*—C.W. Lanham
*Assistant Examiner*—Daniel C. Crane
*Attorney, Agent, or Firm*—Robert H. Bachman; Robert A. Dawson

[57] ABSTRACT

A method for the manufacture of hollow articles comprising providing a first sheet of metal, placing on said first sheet a weld-inhibiting material in a pattern corresponding to a predetermined configuration of fluid passageways, forming an assembly by superimposing a second sheet of metal upon the surface of said first sheet bearing said pattern, pressure welding said assembly in the areas thereof not separated by weld-inhibiting material, and expanding the areas separated by said weld-inhibiting material, wherein the weld-inhibiting pattern provided is so configured that when said assembly is expanded, a marker structure is formed which is situated so as to guide the determination of the final linear dimensions of said article. The foregoing marker enables the rapid, automated sizing of articles such as heat exchange panels produced by the above process.

7 Claims, 11 Drawing Figures

METHOD OF SIZING HEAT EXCHANGE PANELS

CROSS REFERENCE TO RELATED APPLICATION

The present application is a Continuation-In-Part of application Ser. No. 573,953, filed May 2, 1975, by the inventors herein.

BACKGROUND OF THE INVENTION

The present invention relates to the preparation of expanded pressure-welded passageway panels. More particularly, the invention relates to metal panels of the above type having utility in heat exchange applications wherein a heat exchange medium is circulated through said passageways.

As is known in the art, a sheet-like structure having internal hollow passageways is well adapted for use as a heat exchanger wherein a heat exchange medium is to be circulated throughout the structure. A method which is particularly well adapted for producing such devices is that disclosed in U.S. Pat. No. 2,690,002, issued Sept. 28, 1954, to Grenell, and known in the art as the ROLL-BOND process. In the practice of the invention disclosed in the aforesaid patent, a structure is provided to which necessary connections may be made for the circulation of heat exchange media. As can be appreciated, said connections can vary in number and displacement to suit the end use of the heat exchange structure. For example, U.S. Pat. No. 2,822,151, issued Feb. 4, 1958, discloses a plate-like heat exchanger provided with a single connection for both entry and exit of fluid, and possesses particular utility for the circulation of refrigerants. Correspondingly, our co-pending application Ser. No. 573,953, the disclosure of which is incorporated herein by reference, illustrates a heat exchange structure provided with longitudinally opposed connections comprising, respectively, inlet and outlet portions provided to enable the continuous flow of heat exchange medium transporting absorbed solar energy.

It can be appreciated that the above method is broadly applicable and amenable to a wide variety of manufacturing procedures. Specifically, said method may be employed whereby individual premeasured panels are provided with a weld-inhibiting pattern to produce a single hollow article, or the size of the panel and the pattern may be so varied to provide a plurality of recurring patterns on a single panel which is later appropriately severed to provide individual final units. Even in the instance where a single panel-single pattern technique is employed, the final product may often need to undergo a sizing operation such as edge trimming to provide the final article in the desired linear dimensions.

In the past, this sizing or trimming operation has proved time-consuming, as the final article or panel must be appropriately aligned with the cutting means by a manual operation such as measurement usually with reference to a strip of tape or the like placed at a specific point on the panel. It can be seen that such a technique is prohibitive in the instance where a multitude of recurring units is provided on a unitary panel or strip, and it is attemped to automate the cutting or sizing operation.

SUMMARY OF THE INVENTION

In accordance with the present invention, a method is provided which permits the rapid determination of the linear dimensions of the formed article prior to conducting the sizing operation.

The method of the present invention comprises providing a first sheet of metal, placing on said first sheet a weld-inhibiting material in a pattern corresponding to a predetermined configuration of fluid passageways, forming an assembly by superimposing a second sheet of metal upon the surface of said first sheet bearing said pattern, pressure welding said assembly in the areas thereof not separated by weld-inhibiting material, and expanding the areas separated by said weld-inhibiting material by the introduction of pressure therein, wherein the weld-inhibiting pattern provided is of such configuration that a marker structure is formed when said assembly is expanded, which is situated so as to guide the determination of the final linear dimensions of the article.

The invention further comprises a panel having a system of internal passageways provided therein, said passageways being in a predetermined pattern, said pattern further defining a nib-like marker structure provided to guide the determination of the final linear dimensions of said panel.

The method of the present invention is particularly useful in connection with the preparation of hollow articles by the ROLL-BOND process. Said articles, in turn, encompass a broad range of applications including heat exchange structures such as refrigerator evaporators and solar collector panels.

The provision of the nib-like marker in the pattern of panels produced by the method of the invention permits the rapid and, if desired, automated sizing of panels produced thereby. The provision of said marker is compatible with the function of the resulting article, and may be provided as either an inflated or a bonded area.

Accordingly, it is a principal of the present invention to provide a method for the manufacture of hollow articles possessing internal passageways which is both economical and expeditious in practice.

It is a further object of the present invention to provide a method as aforesaid which facilitates the rapid, automated sizing of panels produced thereby.

It is a further object of the present invention to provide a method as aforesaid wherein said passageways are defined by the provision of a pattern of weld-inhibiting material which further defines the size and placement of a marker structure employed in said sizing operation.

It is a yet further object of the present invention to provide a panel possessing internal passageways prepared by the method as aforesaid which further defines a nib-like marker structure provided to facilitate the determination of the final dimensions thereof.

Further objects and advantages will become apparent from a consideration of the ensuing specification which proceeds with reference to the following drawings. DR

DETAILED DESCRIPTION

In accordance with the present invention, the foregoing objects and advantages are readily attained.

The invention is broadly applicable to the preparation of articles such as panels possessing a system of internal passageways therein, but is particularly applicable to the formation of ROLL-BOND type panels in accordance with the process of the aforementioned Grenell patent, incorporated herein by reference and assigned to the assigneee of the instant invention. The patent discloses a technique wherein a pattern of stop-weld material is sandwiched between the sheets of metal which are joined together.

Figure 1:
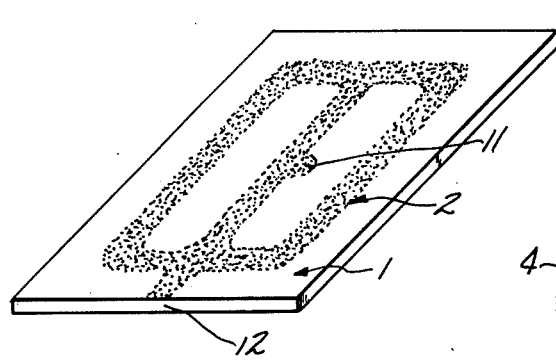
FIG. 1 is a perspective view of a sheet of metal having a pattern of weld-inhibiting material applied to a surface thereof, illustrating the provision of the marker structure in accordance with the invention.

Referring now to FIG. 1, there is shown a first sheet 1 of metal which is the typical starting material in this invention. First sheet 1 may be prepared from any metal which is capable of being joined as hereinafter described. Accordingly, first sheet 1 is provided with a pattern of stop-weld material 2 which is applied to one surface or face thereof.

Figure 2:
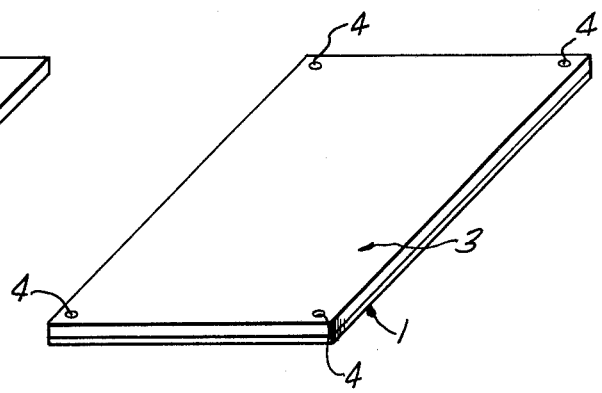
FIG. 2 is a perspective view of a composite metal blank wherein a second sheet of metal is superimposed on the sheet of metal shown in FIG. 1 with the pattern of weld-inhibiting material sandwiched therebetween.

As shown in FIG. 2, a second sheet 3 of metal is superimposed upon the surface of first sheet 1 bearing stop-weld pattern 2, and brought into intimate contact therewith. In general, second sheet 3 may be of the same metal as first sheet 1, or may be of a different metal or alloy. Further, the thicknesses of sheets 1 and 3 need not be alike. After sheets 1 and 3 are brought into contact, the sheets are secured together to prevent the relative slippage of the adjacent surfaces of the sheets during a subsequently conducted welding operation. Securing of sheets 1 and 3 may be accomplished by techniques known in the art, such as spot welding, preferably conducted at the locations 4 in the corners of the panel. In addition to spot welding, said panel may be subjected to a punching operation at locations 4 which serves to provide a mechanical joint between panels 1 and 3. This punching operation is fully disclosed in U.S. Pat. Nos. 3,729,804 and 3,781,971, to Middleton, commonly assigned, which are incorporated herein by reference.

Figure 3:
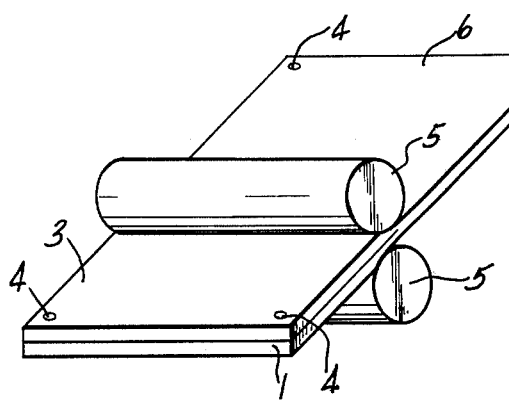
FIG. 3 is a schematic perspective view showing the sheets of FIG. 2 being welded together while passing through a pair of mill rolls.

Secured sheets 1 and 3 are then welded together throughout their contacting faces not separated by stop-weld material 2. Said welding comprises a pressure welding procedure accomplished by a rolling operation in accordance with the process outline in the aforementioned Grenell patent. Referring now to FIG. 3, the superimposed sheets 1 and 3 are subjected to a hot rolling treatment, wherein said sheets are first heated and then passed through rolls 5 between which they are reduced in thickness and elongated in the direction of rolling. The resulting blank 6, having an unjoined inner portion corresponding to stop-weld pattern 2, may then be softened in any appropriate manner as by annealing, and thereafter blank 6 may be rolled to provide a more even thickness and again annealed.

Figure 4:
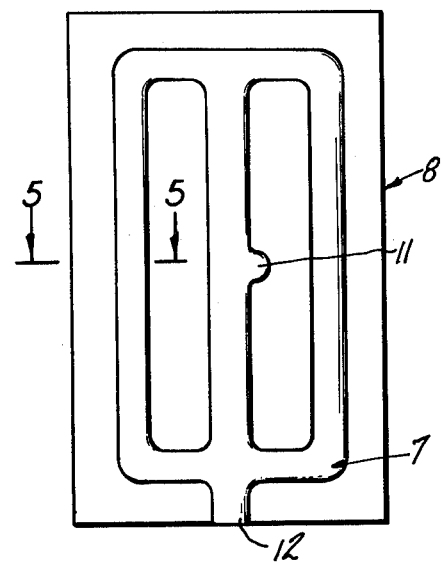
FIG. 4 is a top view of a panel prepared in accordance with the present invention illustrating the central placement of the marker structure.
Figure 5:
FIG. 5 is a sectional view taken along lines 5—5 of FIG. 4.
Figure 6:
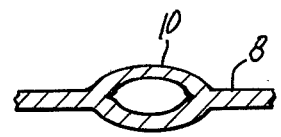
FIG. 6 is an alternate view showing a variation in the tube configuration similar to the view of FIG. 5.

Subsequent to the preparation of blank 6, the portions adjacent the weld-inhibiting material or stop-weld material 2 are then inflated by the introduction of fluid distending pressure, such as with air or water, in a manner known in the art to form a system of internal tubular passageways 7 corresponding to the pattern of stop-weld material 2, as illustrated in FIG. 4. Passageways 7 extend internally within panel 8 and are disposed between spaced apart portions of the thickness of said panel. Thus, panel 8 comprises a hollow sheet metal panel or plate having a system of fluid passageways 7 for a heat exchange medium extending internally therein. If the passageways are inflated by the introduction of fluid distending pressure between flat die platens, the resultant passageways have a flat topped configuration 9 as shown in FIG. 5. If, on the other hand, passageways 7 are formed without the presence of superimposed platens, the resultant passageway configuration has a roughly semicircular shape 10 as shown in FIG. 6.

Upon the completion of the foregoing procedure, panel 8 is generally subjected to an operation designed to confer the final linear dimensions thereto. As noted earlier, this operation can vary with the nature of the preceding manufacturing sequence; that is, if production comprises the preparation of single hollow articles or panels, this operation, comprising a sizing operation, will involve the trimming of panel edges by an appropriate means, not shown. If, on the other hand, the foregoing sequence produces a multiplicity of units on a single sheet or blank, the sizing operation will comprise the measurement of the dimensions of the final articles followed by the cutting of the blank into units conforming thereto. In either event, the procedure of measurement and cutting is time-consuming and tedious and does not lend itself easily to high-speed, automated manufacturing techniques.

In accordance with the present invention, a modification of the manufacturing sequence has been found which serves to alleviate the foregoing problem. Specifically, the invention contemplates the provision of a nib-like marker structure as part of the configuration of the passageways which may be established in specific linear relation to the ultimate dimensions of the final article. Thus, referring again to FIG. 1, stop-weld pattern 2 is modified in configuration to provide a slight bulge or nib-like marker 11, which is displaced at a location, in this illustration, central with respect to the lateral dimensions of sheet 1, and a predetermined distance from the lower longitudinal edge 12 thereof. Accordingly, when the final panel 8 is inflated as shown in FIG. 4, marker 11 appears as a nib-like distention comprising a part of passageway 7, which can be relied upon for alignment with a cutting means, not shown, to either trim or sever panel 8 at lower edge 12. Naturally, though the preceding discussion has dealt with the alignment with lower edge 12, it is apparent that marker 11 may be utilized to provide alignment for the trimming or cutting of the remaining edges of panel 8, and the aforementioned discussion should not be construed as a limitation on the scope of the present invention.

The invention comprises an article such as a panel having a system of internal passageways provided in a predetermined pattern therein, said passageways possessing at least one opening to permit the flow of fluid therethrough, wherein said pattern further defines a nib-like marker structure adapted to serve as a guide or alignment means in the sizing of said article to determine the final linear dimensions thereof. Thus, marker structure 11 shown in FIG. 4 provides, as noted before, a reference point for the alignment of a cutting apparatus which may be so set as to define the final dimensions of the article. Marker 11 is situated so as not to impede or interfere with the flow of fluid through passageways 7, insofar as its sole function is that of an alignment means.

Figure 7:
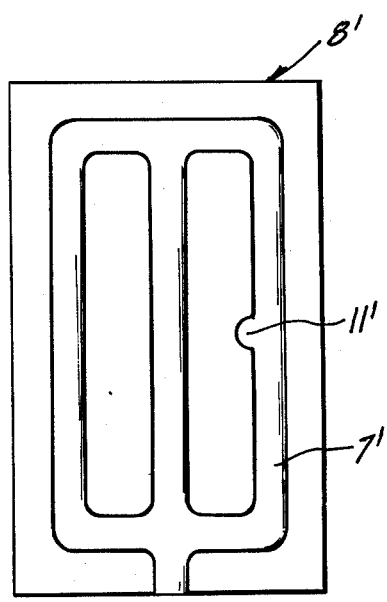
FIG. 7 is an alternate view showing a variation in the location of the marker structure on the panel of FIG. 4.

As indicated earlier, the marker structure of the present invention may serve as an alignment means to assist in the sizing of all linear dimensions. Thus, referring to FIG. 7, marker 11' may, as illustrated therein, be situated in lateral displacement to the center of panel 8' in connection with passageway 7'. It is apparent that the exact location of the marker is optional and will vary with the particular manufacturing requirements of the article comtemplated. Thus, in this illustration, marker 11' is primarily provided to align panel 8' for cutting or shearing of a specific longitudinal dimension. This type of sizing operation is also generally applicable in the instance where a longitudinally extended sheet or panel is prepared which possesses a series of recurring stop-weld patterns thereon which require only severance into specific dimensions of length after bonding.

Figure 8:
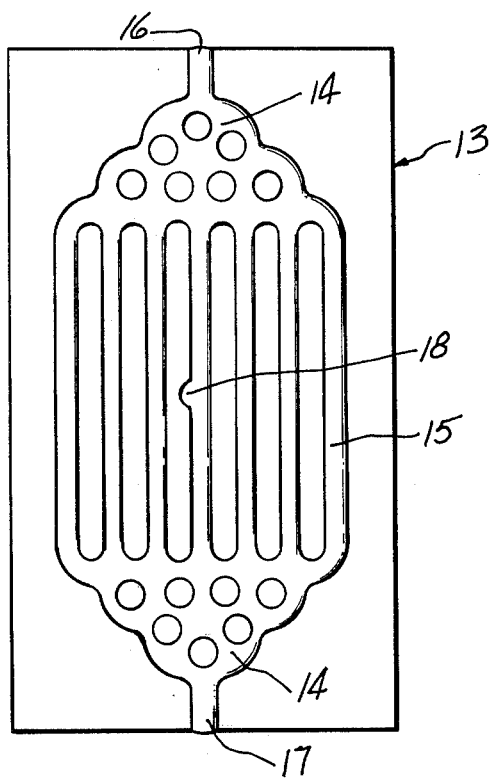
FIGS. 8, 9 and 10 are top views showing variations in panel design in accordance with the present invention.
Figure 9:
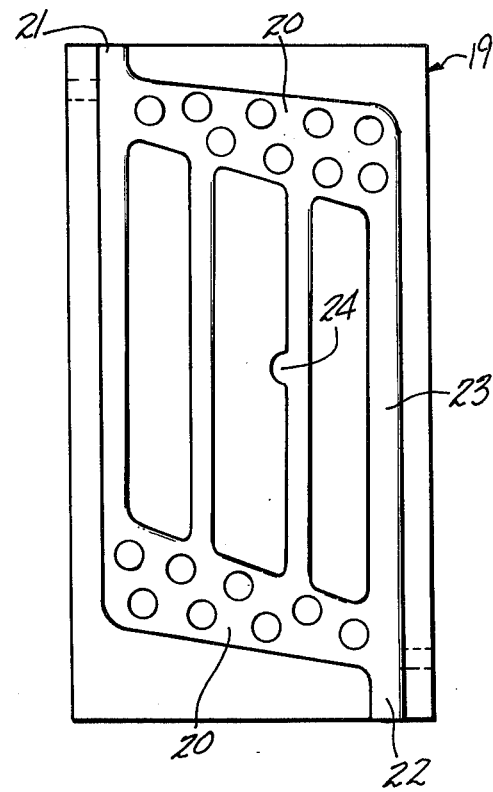
Figure 10:
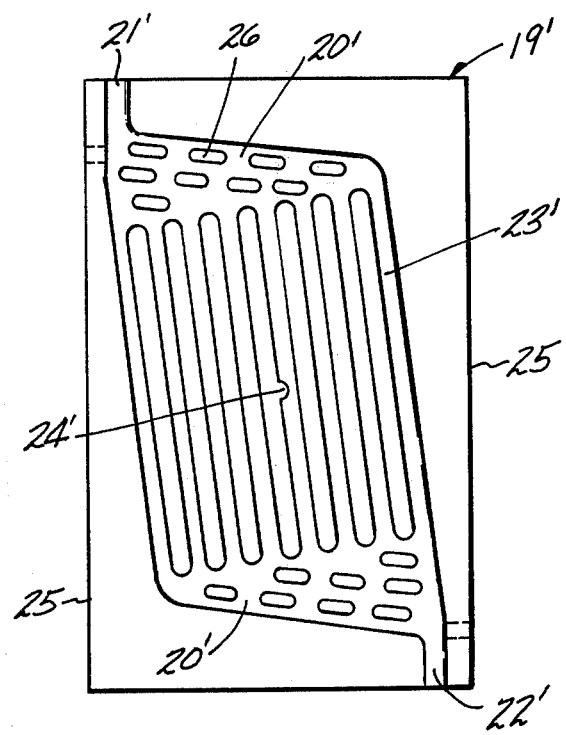

The present invention is generally applicable to hollow articles possessing internal tubular passageways, and particularly to those articles which are prepared by the aforediscussed ROLL-BOND process. As the nature of the ROLL-BOND process provides a broad range of applications, the articles encompassed by the present invention may range in application from refrigerator evaporators to solar collector panels simply by the variation in the configuration of the weld-inhibiting or stop-weld pattern initially provided. Referring now to FIGS. 8–10, there are depicted therein various panel designs having utility as solar collector structures. Specifically, FIG. 8 depicts a solar panel 13 which comprises a pair of opposed headers 14 connected by connecting portions 15 comprising longitudinally extended passageways. Panel 13 is also provided with openings 16 and 17 comprising, respectively, inlet and outlet portions extending from headers 14 to provide ingress and egress openings for the heat exchange medium. In this illustration, marker structure 18 is centrally located in integral relation to connecting portion 15.

Referring now to FIGS. 9 and 10, and particularly to FIG. 9, a panel 19 is disclosed which is a variation of the panel depicted in FIG. 8. Specifically, panel 19 possesses headers 20 comprising essentially triangular units possessing inlet portion 21 and outlet portion 22 in diagonally opposed relationship to each other. Additionally, connecting portions 23 are reduced in number thereof, formed wider in diameter, and marker structure 24 is located somewhat laterally off center, though central with respect to the longitudinal dimension of panel 19. The panel depicted in FIG. 10 comprises a further modification of that set forth in FIG. 9. Panel 19' possesses header structures 20', which are similar in general shape to headers 20 in FIG. 9 with the exception that inlet and outlet portions 21' and 22', respectively, are provided at laterally opposed ends to those of FIG. 9. It should be noted that, in FIGS. 8–10, header structures depicted therein are all disposed at an angle of at least 91° with respect to the fluid flow and generally with respect to the entry and exit portions respectively extending therefrom, in accordance with the disclosure of our co-pending application Ser. No. 573,953.

Returning to FIG. 10, connecting portions 23' are more numerous and are disposed at an angle with respect to the longitudinal edge 25 of panel 19', the value of said angle being at least 1°, in accordance with the aforenoted parent application Ser. No. 573,953. This latter feature permits a wider variation in the disposition of the panel, while assuring efficient, uninterrupted fluid flow.

Further notable features of the panel of FIG. 10 comprise the configuration of headers 20' and the placement of inlet 21' and outlet 22' at the respective widest portions of the headers. Also, bonded portions 26 present in headers 20' are aligned so as to assist in the uniform distribution of fluid flow therethrough. The particular advantages of this panel design will be more fully developed in our copending application Ser. No. 632,643, the disclosure of which is incorporated herein by reference. In this illustration, panel 19' is, of course, provided with a nib-like marker structure 24', centrally located in association with a connecting portion 23'.

Figure 11:
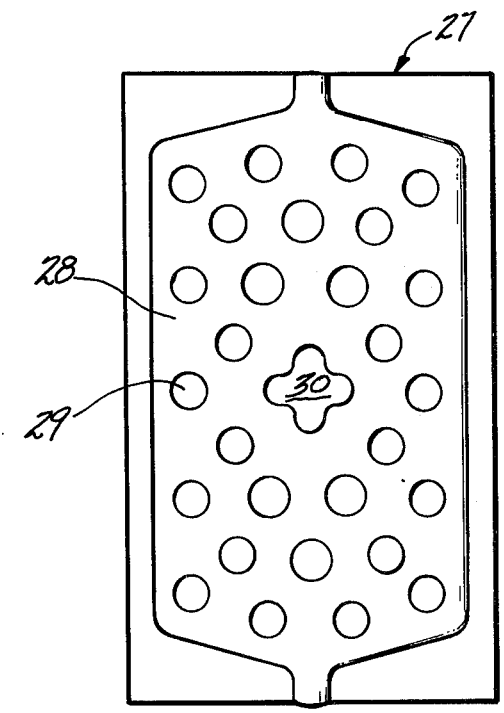
FIG. 11 is a top view showing an alternate embodiment in the provision of the marker of the present invention.

In addition to the placement of a nib-like distension in direct association with an inflated portion of the panels prepared in accordance with the present invention, the marker structure of the present invention may comprise a bonded portion located within an expanse of unbonded area. Referring particularly to FIG. 11, a solar collector panel 27 is depicted which comprises a unitary expanse of unbonded area wherein continuity exists between the header area and the area comprising the connector portions. Thus, unitary collector area 28 is broken up only by a symmetrical pattern of bonded portions. Bonded portions 29 effectively break up fluid flow and permit the efficient passage of heat exchange fluid through panel 27. In this illustration, the marker structure is provided by a centrally located bonded portion 30, rather than an inflated area as previously illustrated. In this instance, bonded portion 30 may be seen to serve the additional purpose of assisting in the break up of fluid flow.

From the foregoing description, it is apparent that the marker structures of the present invention may be provided with equal facility as both bonded areas and unbonded distensions, to serve in the capacity of an alignment means to assist in the sizing operation associated with the preparation of hollow articles possessing a pattern of internal passageways. Though the present invention is suited to a wide variety of applications, it is apparent that a particular utility resides in its employment in conjunction with the preparation of hollow articles in accordance with the ROLL-BOND process.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for the manufacture of hollow articles useful as heat exchangers which comprises providing a first sheet of metal, placing on a surface of said first sheet a weld-inhibiting material in a pattern corresponding to a predetermined configuration of fluid passageways, said pattern including a plurality of longitudinally extending fluid passageways, forming an assembly by superimposing a second sheet of metal upon the surface of said first sheet bearing said pattern, pressure welding said assembly in the areas thereof not separated by weld-inhibiting material, and expanding said assembly in the areas separated by said weld-inhibiting material by the introduction of pressure therein, wherein the weld-inhibiting pattern provided is of such configuration that a marker structure comprising a distension associated with one of said longitudinally extending passageways is formed when said assembly is expanded, said marker structure is situated so as to provide guidance for the determination of the final linear dimensions of the article and utilizing said marker structure to longitudinally and laterally position said heat exchanger for a subsequent cutting operation.

2. The method of claim 1 wherein said determination of final linear dimensions comprises a sizing operation in which said marker is employed to align said assembly with a sizing means.

3. The method of claim 2 wherein said sizing means comprises a cutting apparatus.

4. The method of claim 2 wherein said sizing operation comprises the trimming of the longitudinal and lateral edges of said article.

5. The method of claim 2 wherein said sizing operation comprises the severance of said article into discrete units of specific longitudinal dimension.

6. The method of claim 1 wherein said first and said second sheet are brought into intimate contact and secured to each other prior to the pressure welding of said assembly.

7. The method of claim 1 wherein said pressure welding comprises a hot rolling treatment wherein said assembly is first heated and then passed through reducing rolls.

* * * * *